(12) United States Patent
Li et al.

(10) Patent No.: US 12,218,311 B2
(45) Date of Patent: Feb. 4, 2025

(54) SECONDARY BATTERY, BATTERY MODULE, BATTERY PACK, AND ELECTRICAL DEVICE

(71) Applicant: CONTEMPORARY AMPEREX TECHNOLOGY (HONG KONG) LIMITED, Hong Kong (CN)

(72) Inventors: Quanguo Li, Ningde (CN); Yonghuang Ye, Ningde (CN); Qian Liu, Ningde (CN); Jianfu He, Ningde (CN); Fajun Huang, Ningde (CN); Chenhui Lin, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 0 days.

(21) Appl. No.: 18/366,342

(22) Filed: Aug. 7, 2023

(65) Prior Publication Data

US 2023/0378546 A1    Nov. 23, 2023

Related U.S. Application Data

(63) Continuation of application No. PCT/CN2021/127721, filed on Oct. 29, 2021.

(51) Int. Cl.
| | | |
|---|---|---|
| *H01M 10/0585* | (2010.01) | |
| *H01M 4/38* | (2006.01) | |
| *H01M 4/505* | (2010.01) | |
| *H01M 4/525* | (2010.01) | |
| *H01M 4/58* | (2010.01) | |
| *H01M 4/583* | (2010.01) | |
| *H01M 4/62* | (2006.01) | |
| *H01M 4/02* | (2006.01) | |

(52) U.S. Cl.
CPC ....... *H01M 10/0585* (2013.01); *H01M 4/381* (2013.01); *H01M 4/505* (2013.01); *H01M 4/525* (2013.01); *H01M 4/5825* (2013.01); *H01M 4/583* (2013.01); *H01M 4/622* (2013.01); *H01M 4/623* (2013.01); *H01M 4/625* (2013.01); *H01M 2004/021* (2013.01); *H01M 2004/027* (2013.01); *H01M 2004/028* (2013.01); *H01M 2220/20* (2013.01)

(58) Field of Classification Search
CPC ............. H01M 10/0585; H01M 4/525; H01M 4/5825; H01M 4/505; H01M 4/583; H01M 2004/021; H01M 2004/027; H01M 2004/028

See application file for complete search history.

(56) References Cited

U.S. PATENT DOCUMENTS

| | | |
|---|---|---|
| 2015/0340730 A1 | 11/2015 | Kim et al. |
| 2015/0340732 A1 | 11/2015 | Kim et al. |

FOREIGN PATENT DOCUMENTS

| | | |
|---|---|---|
| CN | 107394209 A | 11/2017 |
| CN | 109980177 A | 7/2019 |
| CN | 113241423 A | 8/2021 |
| JP | 2001351672 A | 12/2001 |
| JP | 2005-38612 | * 2/2005 |

OTHER PUBLICATIONS

ISR for International Application PCT/CN2021/127721 mailed Jul. 27, 2022.
Written Opinion for International Application PCT/CN2021/127721 mailed Jul. 27, 2022.
The extended European search report received in the counterpart European Application 21961952.5, mailed on Nov. 22, 2024.

* cited by examiner

*Primary Examiner* — Laura Weiner
(74) *Attorney, Agent, or Firm* — Kilpatrick Townsend & Stockton LLP (57) ABSTRACT

A secondary battery includes a positive electrode plate. that includes a positive current collector, a first positive active material layer distributed on one side of the positive current collector, and a second positive active material layer distributed on an other side of the positive current collector and a negative electrode plate that includes a negative current collector, a first negative active material layer distributed on one side of the negative current collector and opposite to the second positive active material layer, and a second negative active material layer distributed on an other side of the negative current collector. A resistance of the first positive active material layer is R1, a resistance of the second positive active material layer is R2, a resistance of the first negative active material layer is R3, a resistance of the second negative active material layer is R4.

12 Claims, 3 Drawing Sheets

SECONDARY BATTERY, BATTERY MODULE, BATTERY PACK, AND ELECTRICAL DEVICE

CROSS-REFERENCE TO RELATED APPLICATIONS

This application is a continuation of International application PCT/CN2021/127721 filed on Oct. 29, 2021, the subject matter of which is incorporated herein by reference in its entirety.

TECHNICAL FIELD

This application relates to a secondary battery, and in particular, to a secondary battery such as a lithium-ion battery; a battery module containing the secondary battery; a battery pack; and an electrical device.

BACKGROUND

With new energy electric vehicles being vigorously promoted by the government, the percentage of the new energy electric vehicles in the vehicle market is increasing. When enjoying the benefits brought by clean energy, people are concerned with disadvantages of the new energy vehicles in the development process thereof, and keep improving. Currently, the most commonly used energy storage battery for use in a new energy electric vehicle are is a lithium-ion secondary battery, including chemical systems such as lithium iron phosphate, lithium manganese oxide, lithium cobalt oxide, and a ternary material containing nickel, cobalt, and manganese. Currently, with respect to the cycle life of a secondary battery, the capacity generally fades to approximately 80% of the initial capacity after the battery is subjected to 1000 to 2000 charge-and-discharge cycles. In this case, the probability of safety accidents of the battery gradually increases if the battery continues to work. Therefore, in order to avoid safety accidents, such batteries are generally eliminated. This not only causes a tremendous waste of batteries, but also brings about a series of problems such as environmental pollution. In the prior art, a general method for increasing the service life of the battery is: (1) improving a surface coating of an active material to reduce side reactions on the surface; (2) increasing the content of a conductive material to reduce a resistance; (3) narrowing the SOC ranges, and the like. The method in the prior art encounters problems of cost increase and technical challenges. Therefore, it is still urgent to improve secondary batteries.

SUMMARY

To solve the problems existing in the prior art, this application pre-stores active ions (such as lithium ions) in a positive electrode plate and slowly releases the active ions during use of a battery to compensate for consumed active ions and achieve objectives of alleviating battery fading and extending a battery life.

According to a first aspect of this application, a secondary battery is provided. The secondary battery includes a positive electrode plate and a negative electrode plate. The positive electrode plate includes a positive current collector, a first positive active material layer distributed on one side of the positive current collector, and a second positive active material layer distributed on an other side of the positive current collector.

The negative electrode plate includes a negative current collector, a first negative active material layer distributed on one side of the negative current collector and opposite to the second positive active material layer, and a second negative active material layer distributed on an other side of the negative current collector.

A resistance of the first positive active material layer is $R1$, a resistance of the second positive active material layer is $R2$, a resistance of the first negative active material layer is $R3$, a resistance of the second negative active material layer is $R4$, and the resistances satisfy the following relationships:

$$R2 > R1; \quad (1)$$

$$R3 > R4; \quad (2)$$

$$0 < (R1+R4)/(R2+R3) \leq 1; \text{ and} \quad (3)$$

$$R1/R2 = A \times R4/R3, \text{ where } A \text{ is } 0.8 \text{ to } 1.2. \quad (4)$$

In an embodiment of this application, A is 0.95 to 1.05.
In an embodiment of this application, $R1$ is $0.1\Omega$ to $20\Omega$, $R2$ is $0.15\Omega$ to $22\Omega$, $R3$ is 0.7 m$\Omega$ to 40 m$\Omega$, and $R4$ is 0.5 m$\Omega$ to 35 m$\Omega$; or, $R1$ is $0.5\Omega$ to $10\Omega$, $R2$ is $0.55\Omega$ to $12\Omega$, $R3$ is 1 m$\Omega$ to 30 m$\Omega$, and $R4$ is 1.1 m$\Omega$ to 30 m$\Omega$.

In an embodiment of this application, a coating weight of a positive active material per unit area of the first positive active material layer is CW1, a coating weight of the positive active material per unit area of the second positive active material layer is CW2, and the coating weight satisfies $0.5 \leq CW1/CW2 < 1$.

In an embodiment of this application, 6.5 mg/cm$^2 \leq CW1 \leq 32.5$ mg/cm$^2$, and 6.5 mg/cm$^2 \leq CW2 \leq 32.5$ mg/cm$^2$; and optionally, 13.0 mg/cm$^2 \leq CW1 \leq 26.0$ mg/cm$^2$, and 13.0 mg/cm$^2 \leq CW2 \leq 26.0$ mg/cm$^2$.

In an embodiment of this application, a coating weight of a negative active material per unit area of the first negative active material layer is CW3, a coating weight of the negative active material per unit area of the second negative active material layer is CW4, and the coating weight satisfies $1 \leq CW3/CW4 < 1.5$.

In an embodiment of this application, 5.2 mg/cm$^2 \leq CW3 \leq 19.5$ mg/cm$^2$, and 5.2 mg/cm$^2 \leq CW4 \leq 19.5$ mg/cm$^2$; and optionally, 8.4 mg/cm$^2 \leq CW3 \leq 16.9$ mg/cm$^2$, and 8.4 mg/cm$^2 \leq CW4 \leq 16.9$ mg/cm$^2$.

In an embodiment of this application, a capacity per unit area of the second positive active material layer is CapA, a capacity per unit area of the first negative active material layer is CapB, and the capacity per unit area satisfies $0.300 \leq CapA/CapB \leq 1.00$, and optionally $0.468 \leq CapA/CapB \leq 0.870$.

In an embodiment of this application, a thickness of the first positive active material layer is T1, a thickness of the second positive active material layer is T2, and the thickness satisfies $T1 \leq T2$.

In an embodiment of this application, a thickness of the first negative active material layer is T3, a thickness of the second negative active material layer is T4, and the thickness satisfies $T4 \leq T3$.

In an embodiment of this application, $0 < (T1+T4)/(T2+T3) \leq 1$.

In an embodiment of this application, a compacted density of the first positive active material layer and/or the second positive active material layer is 2.0 g/cm$^3$ to 3.6 g/cm$^3$, and a compacted density of the first negative active material layer and/or the second negative active material layer is 0.5 g/cm$^3$ to 2 g/cm$^3$; or, a compacted density of the first positive active material layer and/or the second positive active material layer is 2.3 g/cm$^3$ to 3.5 g/cm$^3$, and a compacted density of the first negative active material layer and/or the second negative active material layer is 1.0 g/cm$^3$ to 1.8 g/cm$^3$.

In an embodiment of this application, the first positive active material layer and/or the second positive active material layer each independently contain at least one of an NCM ternary material, an NCA ternary material, lithium iron phosphate, lithium manganese oxide, lithium cobalt oxide, active-sodium-ion-containing oxide, a polyanion material, or a prussian blue-based material.

In an embodiment of this application, the first positive active material layer and/or the second positive active material layer each independently contain a conductive agent and a binder, the conductive agent is graphite, carbon black, acetylene black, graphene, carbon nanotubes, or a combination thereof, and the binder is selected from polyvinylidene difluoride, polyacrylic acid, polytetrafluoroethylene, polyimide, or a combination thereof.

In an embodiment of this application, the first negative active material layer and/or the second negative active material layer each independently contain natural graphite, artificial graphite, graphene, carbon nanotubes, soft carbon, hard carbon, or a combination of two or more thereof.

According to a second aspect of this application, a battery module is provided, including the secondary battery according to this application.

According to a third aspect of this application, a battery pack is provided, including the secondary battery or battery module disclosed in this application.

According to a fourth aspect of this application, an electrical device is provided, including the secondary battery, battery module, or battery pack disclosed in this application. The secondary battery or battery module or battery pack is used as a power supply of the electrical device or an energy storage unit of the electrical device.

In contrast to the prior art, by adjusting the resistance of the active material layers on both sides of the current collector in the positive electrode plate and the resistance of the active material layers on both sides of the current collector in the negative electrode plate, and by matching between the two sides, this application achieves the effects of extending the service life of the battery and increasing the energy density of the battery.

Such features and advantages, among others, are evidently set out in the following detailed description with reference to the relevant drawings. Understandably, both the foregoing summary and the following detailed description are merely illustrative and rather than restrictive of the protection scope claimed.

REFERENCE NUMERALS

1. Battery pack;
2. Upper box;
3. Lower box;
4. Battery module;
5. Secondary battery;
51. Housing;
52. Electrode assembly; and
53. Cover plate.

DETAILED DESCRIPTION

This application is described in detail below with reference to drawings, and the features of this application are further revealed in the following detailed description.

A "range" disclosed herein is defined by a lower limit and an upper limit. A given range is defined by selecting a lower limit and an upper limit, and the selected lower and upper limits define the boundaries of the given range. A range so defined may be inclusive or exclusive of the end values, and may be arbitrarily combined. That is, any lower limit may be combined with any upper limit to form a range. For example, if a range of 60 to 120 and a range of 80 to 110 are listed for a given parameter, it is expectable that such ranges may be understood as 60 to 110 and 80 to 120. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, the numerical range "0 to 5" means that all real numbers between 0 and 5 inclusive are listed herein, and the range "0 to 5" is just a brief representation of combinations of such numbers. In addition, when a parameter is expressed as an integer greater than or equal to 2, the expression is equivalent to that the parameter is an integer such as 2, 3, 4, 5, 6, 7, 8, 9, 10, 11, 12, and the like.

It is hereby noted that, unless otherwise specified herein, all embodiments and preferred embodiments mentioned herein may be combined with each other to form a new technical solution. Unless otherwise specified herein, all technical features and preferred technical features mentioned herein may be combined with each other to form a new technical solution.

Unless otherwise expressly specified herein, "include" and "comprise" mentioned herein mean open-ended inclusion, and may also mean close-ended inclusion. For example, the terms "include" and "comprise" may mean inclusion of other items not listed, or inclusion of only the listed items.

In the description herein, unless otherwise specified, the term "or" is inclusive. For example, the phrase "A or B" means "A alone, B alone, or both A and B." More specifically, the condition "A or B" is satisfied by any of the following: A is true (or existent) and B is false (or absent); A is false (or absent) and B is true (or existent); or, both A and B are true (or existent).

In this application, a resistance of a first positive active material layer is R1, a resistance of a second positive active material layer is R2, a resistance of a first negative active material layer is R3, a resistance of a second negative active material layer is R4, and the resistances satisfy the following relationships: (1) R2>R1; (2) R3≥R4; (3) 0<(R1+R4)/(R2+R3)≤1; and (4) R1/R2=A×R4/R3, where A is 0.8 to 1.2.

Generally, when a secondary battery starts to be charged, active material layers on both sides of a positive current collector begin a process by which active lithium ions are deintercalated from a positive electrode material, pass through a separator, and are intercalated into negative electrode graphite, and by which electrons are transferred to a negative electrode through the positive current collector and an external circuit. In this case, a potential difference between the active material layer on each of two sides of the positive current collector and a corresponding negative active material layer is equal between the two sides. In this application, the resistance of the active material layer on both sides of the positive current collector is set to be R2>R1. During a charging process of the secondary battery, lithium ions in the active material layer on a higher-resistance side (hereinafter referred to as an R2 side) are deintercalated more slowly. When the battery reaches a charging cut-off voltage, some lithium ions that have not been deintercalated are retained in the active material layer on the R2 side, thereby helping to pre-store some active lithium ions on one side of the positive electrode plate. Such active lithium ions are gradually released along with charge-and-discharge cycles of the battery, thereby effectively alleviating the capacity fading of the battery. In order to ensure that the potential of the positive active material layer on each of two sides of the positive electrode plate matches the potential of a corresponding negative active material layer, the resistance of the first negative active material layer (also referred to as an R3 side) opposite to the R2 side needs to be greater than the resistance of the second negative active material layer (also referred to as an R4 side) opposite to the R1 side. On this basis, the application further defines that the positive electrode plate and the negative electrode plate satisfy 0<(R1+R4)/(R2+R3)≤1, and R1/R2=A×R4/R3, where A may range from 0.8 to 1.2. This ensures a sufficient amount of active lithium ions pre-stored in the secondary battery, and also ensures that polarization in the battery is on a relatively low level, and that the energy density of the battery is relatively high, thereby helping to extend the cycle life of the secondary battery and increase the energy density of the battery.

In an embodiment of this application, A may fall within a range defined by any two of the following values: 0.80, 0.85, 0.90, 0.95, 1.00, 1.05, 1.10, 1.15, and 1.20. It is hereby emphasized that although the foregoing values are listed in parallel, it does not mean that all ranges defined by any two of the values can achieve equivalent or similar performance. The same applies to the numerical ranges mentioned below. With respect to a preferred embodiment of this application, the embodiment is selected just based on the detailed discussion below and specific experimental data. In an optional embodiment of this application, A is 0.95 to 1.05.

In an embodiment of this application, on the basis of satisfying the foregoing relational expressions (1) to (4), R1 may fall within a range defined by any two of the following values: 0.1Ω, 0.5Ω, 1Ω, 5Ω, 10Ω, 15Ω, and 20Ω; R2 may fall within a range defined by any two of the following values: 0.15Ω, 0.55Ω, 1Ω, 3Ω, 6Ω, 9Ω, 12Ω, 16 Ω, 19Ω, and 22Ω; R3 may fall within a range defined by any two of the following values: 0.7 mΩ, 1 mΩ, 5 mΩ, 10 mΩ, 20 mΩ, 30 mΩ, 35 mΩ, and 40 mΩ; and R4 may fall within a range defined by any two of the following values: 0.5 mΩ, 1.1 mΩ, 5 mΩ, 10 mΩ, 20 mΩ, 30 mΩ, and 35 mΩ. In this application, R1, R2, R3, and R4 can ensure that, when two sides of the positive electrode plate in the secondary battery are discharged simultaneously, the side with a relatively large amount of transferable active material will retain a part of the active material. With the cycling and wear of the secondary battery, the retained transferable active material is gradually released, thereby postponing the fading of the battery and increasing the cycle life. In an optional embodiment of this application, R1 is 0.1Ω to 20Ω, R2 is 0.15Ω to 22Ω, R3 is 0.7 mΩ to 40 mΩ, and R4 is 0.5 mΩ to 35 mΩ; or, R1 is 0.5Ω to 10Ω, R2 is 0.55Ω to 12Ω, R3 is 1 mΩ to 30 mΩ, and R4 is 1.1 mΩ to 30 mΩ.

In an embodiment of this application, the first positive active material layer includes an active ion compound in an amount of CW1, the second positive active material layer includes an active ion compound in an amount of CW2, and the amount satisfies 0.5≤CW1/CW2≤1. The ratio of CW1/CW2 may fall within a range defined by any two of the following values: 0.5, 0.6, 0.7, 0.8, 0.9, 0.95, and 0.99. When the ratio of CW1/CW2 falls within the foregoing range, the side (CW2) with a relatively large amount of transferable active material will retain a part of the active material. With the cycling and wear of the secondary battery, the retained transferable active material is gradually released, thereby postponing the fading of the battery and increasing the cycle life.

In an embodiment of this application, on the basis of satisfying 0.5≤CW1/CW2≤1, measured by the weight of active ions per unit area, CW1 may fall within a range defined by any two of the following values: 6.5 mg/cm², 9.5 mg/cm², 13.0 mg/cm², 18.5 mg/cm², 26.0 mg/cm², and 32.5 mg/cm²; and CW2 may fall within a range defined by any two of the following values: 6.5 mg/cm², 9.5 mg/cm², 13.0 mg/cm², 18.5 mg/cm², 26.0 mg/cm², and 32.5 mg/cm². In an optional embodiment of this application, measured by the weight of active ions per unit area, 6.5 mg/cm²≤CW1≤32.5 mg/cm², and 6.5 mg/cm²≤CW2≤32.5 mg/cm²; or, 13.0 mg/cm²≤CW1≤26.0 mg/cm², and 13.0 mg/cm²≤CW2≤26.0 mg/cm².

In an embodiment of this application, the first negative active material layer includes an active ion vacancy material in an amount of CW3, the second negative active material layer includes an active ion vacancy material in an amount of CW4, and the amount satisfies 1≤CW3/CW4≤1.5. In this application, the ratio of CW3/CW4 may fall within a range defined by any two of the following values: 1.0, 1.05, 1.10, 1.15, 1.20, 1.25, 1.30, 1.35, 1.40, 1.45, and 1.50. When the ratio of CW3/CW4 falls within the foregoing range, the energy density of the secondary battery according to this application is improved.

In an embodiment of this application, on the basis of satisfying 1≤CW3/CW4≤1.5, measured by the weight of active ion vacancy material per unit area, CW3 may fall within a range defined by any two of the following values: 5.2 mg/cm², 8.4 mg/cm², 12.0 mg/cm², 14.6 mg/cm², 16.9 mg/cm², and 19.5 mg/cm²; and CW4 may fall within a range defined by any two of the following values: 5.2 mg/cm², 8.4 mg/cm², 12.0 mg/cm², 14.6 mg/cm², 16.9 mg/cm², and 19.5 mg/cm². In an optional embodiment of this application, measured by the weight of active ions vacancy material per unit area, 5.2 mg/cm²≤CW3≤19.5 mg/cm², and 5.2 mg/cm²≤CW4≤19.5 mg/cm²; or, 8.4 mg/cm²≤CW3≤16.9 mg/cm², and 8.4 mg/cm²≤CW4≤16.9 mg/cm².

In an embodiment of this application, the capacity per unit area of the first positive active material layer and the second positive active material layer is CapA, the capacity per unit area of the first negative active material layer and the second negative active material layer is CapB, and the capacity per unit area satisfies $0.300 \leq CapA/CapB \leq 0.933$. In this application, the ratio of CapA/CapB may fall within a range defined by any two of the following values: 0.300, 0.368, 0.400, 0.450, 0.500, 0.550, 0.670, and 0.933. When the ratio of CapA/CapB falls within the foregoing range, the secondary battery according to this application can avoid the "lithium plating" phenomenon caused by excessive positive active material (such as lithium) that overflows from the negative electrode, where the lithium plating impairs the cycle life of the secondary battery.

In an embodiment of this application, the first positive active material layer includes an active ion compound layer with a thickness of T1, the second positive active material layer includes an active ion compound layer with a thickness of T2, and the thickness satisfies T1<T2. In this application, the coating thickness of the active ion compound in the second positive active material layer may be greater than the coating thickness of the active ion compound in the first positive active material layer. Therefore, the amount of transferable active material (such as lithium) on the second positive active material layer (also referred to as an R2 side) is greater than the amount of the transferable active material on the first positive active material layer (also referred to as an R1 side).

In an embodiment of this application, the first negative active material layer includes an active ion vacancy material layer with a thickness of T3, the second negative active material layer includes an active ion vacancy material layer with a thickness of T4, and the thickness satisfies T4<T3. In this application, the coating thickness of the active ion vacancy material in the first negative active material layer (also referred to as an R3 side) opposite to the R2 side may be greater than the coating thickness of the active ion vacancy material in the second negative active material layer (also referred to as an R4 side) opposite to the R1 side, so that the negative electrode can provide enough vacancies to accommodate lithium ions.

In an embodiment of this application, it is satisfied that $0<(T1+T4)/(T2+T3) \leq 1$. This range ensures that, on the side coated with a relatively small amount of transferable active material on the positive electrode plate, or, on the side containing a relatively small amount of active ion vacancy material on the corresponding negative electrode plate, the resistance is low, the polarization is slight, and the transfer of the transferable active material (such as lithium) can occur preferentially. This range ultimately ensures that a part of the transferable active material can be retained on the heavily coated side.

In this application, the compacted density of the first positive active material layer and the second positive active material layer of the secondary battery is controlled, thereby shortening an ion transmission path and improving the cycle life of the secondary battery without causing the following problems: because the compacted density is excessive, particles of the active material are broken, the specific surface area (BET) increases, and in turn, side reactions occur, and the cycle life of the secondary battery is shortened to some extent. In an embodiment of this application, the compacted density of the first positive active material layer and/or the second positive active material layer may fall within a range defined by any two of the following values: 2.0 g/cm$^3$, 2.3 g/cm$^3$, 2.6 g/cm$^3$, 2.9 g/cm$^3$, 3.2 g/cm$^3$, 3.5 g/cm$^3$, and 3.6 g/cm$^3$. The compacted density of the first negative active material layer and/or the second negative active material layer may fall within a range defined by any two of the following values: 0.5 g/cm$^3$, 0.8 g/cm$^3$, 1.0 g/cm$^3$, 1.3 g/cm$^3$, 1.5 g/cm$^3$, 1.8 g/cm$^3$, and 2.0 g/cm$^3$. In an optional embodiment of this application, the compacted density of the first positive active material layer and/or the second positive active material layer is 2.0 g/cm$^3$ to 3.6 g/cm$^3$ or 2.3 g/cm$^3$ to 3.5 g/cm$^3$; and the compacted density of the first negative active material layer and/or the second negative active material layer is 0.5 g/cm$^3$ to 2 g/cm$^3$ or 1.0 g/cm$^3$ to 1.8 g/cm$^3$.

The following describes, mainly based on a secondary battery, especially based on a lithium-ion secondary battery, the performance improvements brought by coating two sides of the positive electrode plates of this application with different amounts of transferable active material. It is hereby emphasized that the design of different coating amounts on the two sides of the positive electrode plate of this application is applicable to any electrical device containing a carbon-based electrode, and benefits the electrical device.

Secondary Battery

In an embodiment of this application, a secondary battery is provided. The secondary battery may be a lithium-ion secondary battery, a potassium-ion secondary battery, a sodium-ion secondary battery, a lithium sulfur battery, or the like, and preferably a lithium-ion secondary battery. The secondary battery according to this application includes a positive electrode (plate), a negative electrode (plate), a separator, an electrolyte or electrolytic solution, and the like. In a charge-and-discharge cycle of the battery, active ions are shuttled between the positive electrode plate and the negative electrode plate by intercalation and deintercalation. The electrolyte serves to conduct ions between the positive electrode plate and the negative electrode plate.

[Positive Electrode Plate]

In the secondary battery according to this application, the positive electrode plate includes a positive current collector and a positive film layer (or referred to as a positive active material layer) disposed on at least one surface of the positive current collector and containing a positive active material. For example, the positive current collector includes two surfaces oriented back from each other in a thickness direction thereof. The positive film layer is disposed on either or both of the two back-oriented surfaces of the positive current collector. In the secondary battery of this application, the positive current collector may be a metal foil or a composite current collector. For example, the metal foil may be an aluminum foil, and the composite current collector may include a polymer material substrate and a metal layer formed on at least one surface of the polymer material substrate. The composite current collector may be formed by overlaying a polymer material substrate with a metal material (aluminum, aluminum alloy, nickel, nickel alloy, titanium, titanium alloy, silver, silver alloy, and the like). The polymer material substrate may be, for example, polypropylene (PP), polyethylene terephthalate (PET), polybutylene terephthalate (PBT), polystyrene (PS), polyethylene (PE), or a copolymer thereof.

In the secondary battery according to this application, the positive active material may be a well-known positive active material for use in a secondary battery in the art. For example, the positive active material may include one or more of: olivine-structured lithium-containing phosphate, lithium transition metal oxide, or a modified compound thereof. However, this application is not limited to such materials, and other conventional materials usable as a positive active material of a secondary battery may be used instead. One of the positive active materials may be used alone, or at least two thereof may be combined and used together. Examples of the lithium transition metal oxide may include, but are not limited to, one or more of lithium cobalt oxide (such as LiCoO$_2$), lithium nickel oxide (such as LiNiO$_2$), lithium manganese oxide (such as LiMnO$_2$, and LiMn$_2$O$_4$), lithium nickel cobalt oxide, lithium manganese cobalt oxide, lithium nickel manganese oxide, lithium nickel cobalt manganese oxide (such as LiNi$_{1/3}$Co$_{1/3}$Mn$_{1/3}$O$_2$ (NCM333), LiNi$_{0.5}$Co$_{0.2}$Mn$_{0.3}$O$_2$ (NCM523), LiNi$_{0.5}$Co$_{0.25}$Mn$_{0.25}$O$_2$ (NCM211), LiNi$_{0.6}$Co$_{0.2}$Mn$_{0.2}$O$_2$ (NCM622), LiNi$_{0.8}$Co$_{0.1}$Mn$_{0.1}$O$_2$ (NCM811)), lithium nickel cobalt aluminum oxide (such as LiNi$_{0.85}$Co$_{0.15}$Al$_{0.05}$O$_2$), or a modified compound thereof. Examples of the olivine-structured lithium-containing phosphate may include, but are not limited to, one or more of lithium iron phosphate (such as LiFePO$_4$ (LFP)), a composite of lithium iron phosphate and carbon, lithium manganese phosphate (such as LiMnPO$_4$), a composite of lithium manganese phosphate and carbon, lithium manganese iron phosphate, or a composite of lithium manganese iron phosphate and carbon. In an embodiment of this application, the second positive active material layer and/or the third positive active material layer are identical or different, and each are selected from lithium iron phosphate (LFP), lithium manganese oxide (LMO), lithium nickel cobalt manganese oxide (NCM), lithium cobalt oxide (LCO), lithium nickel cobalt aluminum oxide (NCA), active-sodium-ion-containing oxide, a polyanion material, or a prussian blue-based material.

In some embodiments, the positive film layer further optionally includes a binder. Examples of the binder applicable to the positive film layer include, but are not limited to, one or more of: polyvinylidene difluoride (PVDF), polytetrafluoroethylene (PTFE), poly(vinylidene fluoride-co-tetrafluoroethylene-co-propylene), poly(vinylidene fluoride-co-hexafluoropropylene-co-tetrafluoroethylene), poly(tetrafluoroethylene-co-hexafluoropropylene), or fluorinated acrylate resin. In an embodiment of this application, the first positive active material layer and/or the second positive active material layer each independently contains a binder selected from polyvinylidene difluoride, polyacrylic acid, polytetrafluoroethylene, polyimide, or a combination thereof.

In some embodiments, the positive film layer further optionally includes a conductive agent. Examples of the conductive agent applicable to the positive film layer may include one or more of superconductive carbon, acetylene black, carbon black, Ketjen black, carbon dots, carbon nanotubes, graphene, or carbon nanofibers. In an embodiment of this application, the first positive active material layer and/or the second positive active material layer each independently contain a conductive agent. The conductive agent is graphite, carbon black, acetylene black, graphene, carbon nanotubes, or a combination thereof.

In an embodiment of this application, the positive electrode may be prepared by the following method: dispersing the ingredients of the positive electrode such as the positive active material, the conductive agent, and the binder and any other ingredients in a solvent (such as N-methyl-pyrrolidone) to form a homogeneous positive slurry, coating a positive current collector with the positive slurry, and performing steps such as drying and cold calendering to obtain the positive electrode plate.

[Negative Electrode Plate]

The secondary battery according to this application includes a negative electrode plate. The negative electrode plate includes a negative current collector and a negative film layer (or referred to as a negative active material layer) disposed on at least one surface of the negative current collector. In an embodiment of this application, the first negative active material and the second negative active material are identical or different, and each independently contain natural graphite, artificial graphite, graphene, carbon nanotubes, soft carbon, hard carbon, or a combination of two or more thereof.

In an embodiment of this application, the negative film layer may include, in addition to the negative active materials described herein above, a given amount of other common negative active materials, for example, one or more of natural graphite, other artificial graphite, soft carbon, hard carbon, silicon-based material, tin-based material, or lithium titanium oxide. The silicon-based material may be one or more selected from simple-substance silicon, oxide of silicon, or silicon-carbon composite. The tin-based material may be one or more selected from simple-substance tin, tin-oxygen compound, or tin alloy.

In the secondary battery according to this application, the negative film includes a negative active material, an optional binder, an optional conductive agent, and other optional agents, and is generally formed by being coated with and drying a negative slurry. The negative slurry is generally formed by dispersing a negative active material, an optional conductive agent, a binder, and the like into a solvent and then stirring well. The solvent may be N-methyl-pyrrolidone (NMP) or deionized water.

As an example, the conductive agent may include one or more of superconductive carbon, carbon black (such as acetylene black and Ketjen black), carbon dots, carbon nanotubes, graphene, or carbon nanofibers.

As an example, the binder may include one or more of styrene-butadiene rubber (SBR), water-soluble unsaturated resin SR-1B, polyacrylic acid (PAA), polyacrylic acid sodium (PAAS), polyacrylamide (PAM), polyvinyl alcohol (PVA), sodium alginate (SA), or carboxymethyl chitosan (CMCS). As an example, the binder may include one or more of styrene-butadiene rubber (SBR), polyvinyl alcohol (PVA), sodium alginate (SA), polymethyl acrylic acid (PMAA), or carboxymethyl chitosan (CMCS). Other optional agents are, for example, a thickener (such as sodium carboxymethyl cellulose CMC-Na), and a PTC thermistor material.

In addition, in the secondary battery according to this application, the negative electrode plate does not exclude other additional functional layers other than the negative film layer. For example, in some embodiments, the negative electrode plate according to this application may further include a conductive undercoat layer (for example, formed of a conductive agent and a binder) disposed on a surface of the negative current collector and sandwiched between the negative current collector and the first negative film layer. In other embodiments, the negative electrode plate according to this application may further include a protection layer that overlays the surface of the second negative film layer.

In the secondary battery according to this application, the negative current collector may be a metal foil or a composite current collector. For example, the metal foil may be a copper foil, silver foil, iron foil, or a foil formed by an alloy of the foregoing metals. The composite current collector may include a polymer material substrate and a metal layer formed on at least one surface of the polymer material substrate. The composite current collector may be formed by overlaying a polymer material substrate with a metal material (copper, copper alloy, nickel, nickel alloy, titanium, titanium alloy, silver, silver alloy, and the like). The polymer material substrate is a base layer made of materials such as polypropylene (PP), polyethylene terephthalate (PET), polybutylene terephthalate (PBT), polystyrene (PS), polyethylene (PE), or a copolymer thereof

[Electrolyte]

The electrolyte serves to conduct ions between the positive electrode plate and the negative electrode plate. The electrolyte may be at least one selected from a solid-state electrolyte or a liquid-state electrolyte (that is, electrolytic solution). In some embodiments, the electrolyte is an electrolytic solution. The electrolytic solution includes an electrolyte salt and a solvent. In some embodiments, the electrolyte salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluoro(oxalato) borate), LiBOB (lithium bis(oxalato) borate), $LiPO_2F_2$ (lithium difluorophosphate), LiDFOP (lithium difluoro(bisoxalato) phosphate), and LiTFOP (lithium tetrafluoro(oxalato) phosphate). In an embodiment of this application, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), or (ethylsulfonyl)ethane (ESE). In an embodiment of this application, based on a total weight of the electrolytic solution, the content of the solvent is 60 wt % to 99 wt %, for example 65 wt % to 95 wt %, 70 wt % to 90 wt %, 75 wt % to 89 wt %, or 80 wt % to 85 wt %. In an embodiment of this application, based on a total weight of the electrolytic solution, the content of the electrolyte is 1 wt % to 40 wt %, for example 5 wt % to 35 wt %, 10 wt % to 30 wt %, 11 wt % to 25 wt %, or 15 wt % to 20 wt %.

In an embodiment of this application, the electrolytic solution may further optionally include an additive. For example, the additive may include one or more of a negative film-forming additive or a positive film-forming additive, and may further include additives that can improve some performance indicators of the battery, for example, an additive that improves overcharge performance of the battery, an additive that improves high-temperature performance of the battery, and an additive that improves low-temperature performance of the battery.

[Separator]

In an embodiment of this application, the secondary battery further includes a separator. The separator separates a negative side from a positive side of the secondary battery, and selectively transmits or obstructs materials of different types, sizes, and charges in the system. For example, the separator can insulate electrons, physically isolate the positive active material from the negative active material of the secondary battery, prevent an internal short circuit and form an electric field in a given direction, and enable the ions in the battery to pass through the separator to move between the positive electrode and the negative electrode. In an embodiment of this application, the separator may be made of a material that may include one or more of glass fiber, non-woven fabric, polyethylene, polypropylene, or polyvinylidene difluoride. The separator may be a single-layer film or a multilayer composite film. When the separator is a multilayer composite film, materials in different layers may be identical or different. In an embodiment of this application, the separator is selected from a polyolefin-based separator, a polyester separator, a polyimide separator, a polyamide separator, or a cellulose separator.

In an embodiment of this application, the positive electrode plate, the negative electrode plate, and the separator may be wound or stacked to form an electrode assembly or bare cell.

In an embodiment of this application, the secondary battery may include an outer package. The outer package may be configured to package the electrode assembly and the electrolyte. In some embodiments, the outer package of the secondary battery may be a hard shell such as a hard plastic shell, an aluminum shell, a steel shell, or the like. In other embodiments, the outer package of the secondary battery may be a soft package such as a pouch-type soft package. The material of the soft package may be plastic such as one or more of polypropylene (PP), polybutylene terephthalate (PBT), or polybutylene succinate (PBS).

Figure 1:
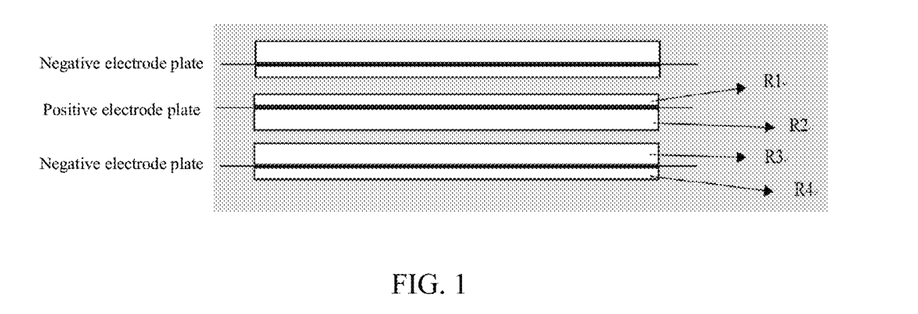
FIG. 1 is a schematic diagram of a positive electrode plate and a negative electrode plate of a secondary battery according to some embodiments of this application.

In this application, as shown in FIG. 1, the positive electrode plate and the negative electrode plate are disposed in such a way that each side coated with a positive active material layer corresponds to a side coated with a negative active material layer. The R1 side of the positive electrode plate contains a relatively large amount of transferable active material, or is coated with a relatively thick active material layer. In contrast, the R2 side of the positive electrode plate contains a relatively small amount of transferable active material, or is coated with a relatively thin active material layer. Similarly, the R3 side opposite to the R1 side of the positive electrode plate contains a relatively large amount of active ion vacancy material, or is coated with a relatively thick active ion vacancy material layer. Similarly, the R4 side of the negative electrode plate contains a relatively small amount of active ion vacancy material, or is coated with a relatively thin active ion vacancy material layer.

Figure 2:
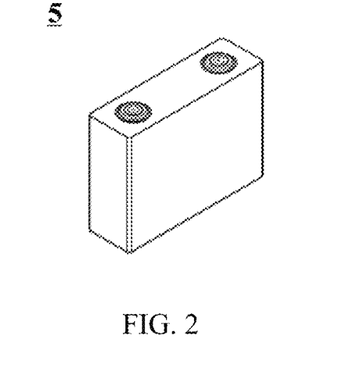
FIG. 2 is a schematic diagram of a secondary battery according to an embodiment of this application.
Figure 3:
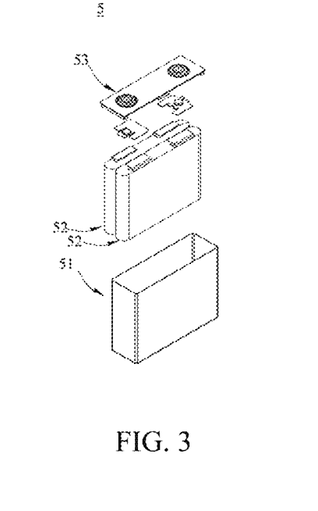
FIG. 3 is an exploded view of the secondary battery shown in FIG. 2.

The shape of the secondary battery according to this application may be cylindrical, prismatic or any other shape. FIG. 2 shows a prismatic secondary battery 5 as an example. FIG. 3 shows an exploded view of the secondary battery 5 shown in FIG. 2. The outer package may include a housing 51 and a cover plate 53. The housing 51 may include a bottom plate and side plates connected to the bottom plate. The bottom plate and the side plates close in to form an accommodation cavity. The housing 51 is provided with an opening that communicates with the accommodation cavity. The cover plate 53 can cover the opening to close the accommodation cavity. The positive electrode plate, the negative electrode plate, and the separator may be wound or stacked to form the electrode assembly 52. The electrode assembly is packaged in the accommodating cavity. The electrolytic solution infiltrates in the electrode assembly 52. The number of electrode assemblies 52 in the secondary battery 5 may be one or more.

In an embodiment of this application, several secondary batteries may be assembled together to form a battery module. The battery module contains two or more secondary batteries, the number of which depends on practical applications of the battery module and parameters of an individual battery module.

Figure 4:
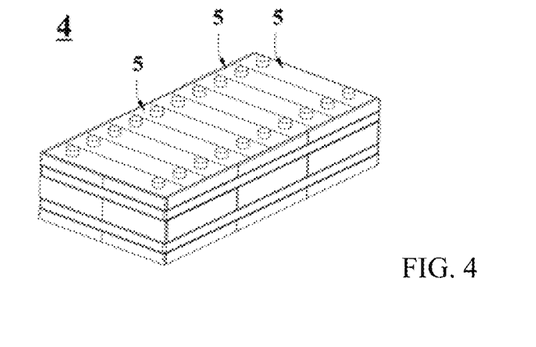
FIG. 4 is a schematic diagram of a battery module according to an embodiment of this application.

FIG. 4 shows a battery module 4 as an example. Referring to FIG. 4, in the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

Optionally, the battery module 4 may further include a shell that provides an accommodation space. The plurality of secondary batteries 5 are accommodated in the accommodation space.

In an embodiment of this application, two or more battery modules may be assembled into a battery pack. The number of the battery modules contained in the battery pack depends on practical applications of the battery pack and parameters of an individual battery module. The battery pack may include a battery box and a plurality of battery modules disposed in the battery box. The battery box includes an upper box and a lower box. The upper box covers and well fits the lower box to form a closed space for accommodating the battery module. The two or more battery modules may be arranged in the battery box in a desired manner.

Figure 5:
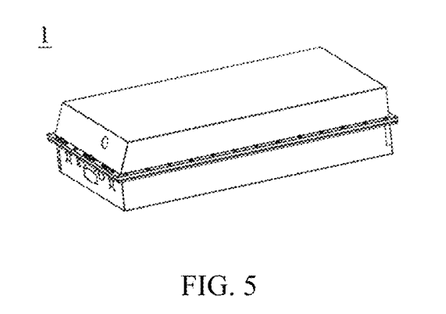
FIG. 5 is a schematic diagram of a battery pack according to an embodiment of this application.
Figure 6:
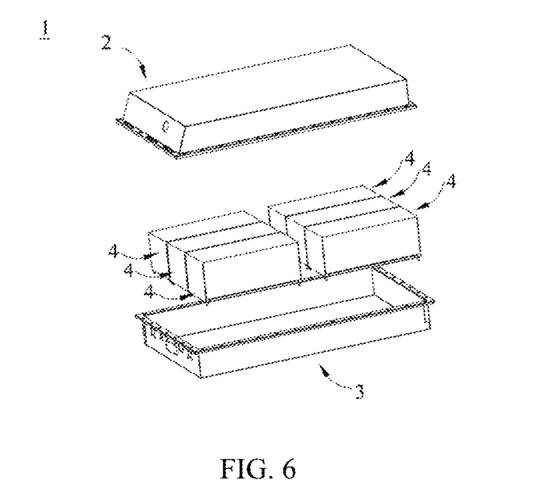
FIG. 6 is an exploded view of the battery pack shown in FIG. 5.

FIG. 5 and FIG. 6 show a battery pack 1 as an example. Referring to FIG. 5 and FIG. 6, the battery pack 1 may contain a battery box and a plurality of battery modules 4 disposed in the battery box. The battery box includes an upper box 2 and a lower box 3. The upper box 2 is configured to fit and cover the lower box 3 to form a closed space for accommodating the battery modules 4. The plurality of battery modules 4 may be arranged in the battery box in any manner.

Electrical Device

In an embodiment of this application, an electrical device according to this application includes at least one of a secondary battery, a battery module, or a battery pack disclosed herein. The secondary battery, battery module, or battery pack may be used as a power supply of the electrical device or an energy storage unit of the electrical device. The electrical device includes, but is not limited to, a mobile digital device (such as a mobile phone or a notebook computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

Figure 7:
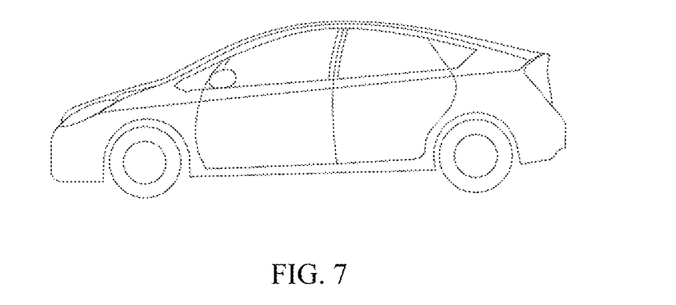
FIG. 7 is a schematic diagram of a device that uses a secondary battery as a power supply according to an embodiment of this application.

FIG. 7 shows a device as an example. The device may be a battery electric vehicle, a hybrid electric vehicle, a plug-in hybrid electric vehicle, or the like. A battery pack or a battery module may be employed to meet the requirements of the device for a high power and a high energy density.

In another example, the device may be a mobile phone, a tablet computer, a notebook computer, or the like. The device is generally required to be thin and light, and may have a secondary battery as a power supply.

With reference to specific embodiments, the following describes the effect exerted on the performance of an electrochemical device by a secondary battery manufactured according to embodiments of this application. It is hereby pointed out that the protection scope of this application is defined by the claims, but not limited to the specific embodiments.

EMBODIMENTS

Unless otherwise specified, all ingredients used herein are analytical reagents, and water used herein is deionized water.

Embodiment 1

Preparing a Positive Electrode Plate

Mixing an NCM523 positive electrode material, conductive carbon black (Super-P), and polyvinylidene difluoride (PVDF) at a weight ratio of 96.2:2.3:1.1 in an N-methyl-pyrrolidone solvent, and stirring evenly to obtain a slurry to be applied onto the positive electrode plate, during which the viscosity may be adjusted by using N-methyl-pyrrolidone, and the stirring may be carried out at a vacuum degree of −80 KPa. Subsequently, coating both sides of a 13-μm-thick positive current collector (aluminum foil) with the slurry evenly at a given width to ensure that the ratio of CW1/CW2 of the active material between the two sides is 0.5. Subjecting the positive electrode plate to cold calendering and slitting (that is, trimming and cutting the electrode plate into a desired size) to make a positive electrode plate.

Preparing a Negative Electrode Plate

Mixing artificial graphite, conductive carbon black (Super-P), sodium carboxymethyl cellulose (CMC), and styrene butadiene rubber (SBR) at a weight ratio of 97:0.5:1:1.5 in water, and stirring evenly to obtain a slurry to be applied onto the negative electrode plate, during which the viscosity may be adjusted by using water. Subsequently, coating both sides of a 6-μm-thick negative current collector (copper foil) with the slurry at a given width to ensure that the ratio of CW3/CW4 of the active ion vacancy material between the two sides is 1.3. Performing cold calendering and slitting to make a negative electrode plate.

Preparing a Lithium-Ion Secondary Battery

Using a 7-μm-thick polyethylene (PE) film as a separator. Winding the positive electrode plate, the separator, and the negative electrode plate into an electrode assembly, welding tabs, packaging the electrode assembly in aluminum shell, injecting electrolytic solution, performing sealing, chemical formation, and degassing to make a lithium-ion secondary battery, in which a battery cell is 148 mm wide, 28 mm thick, and 98 mm high, and provides a capacity of 40 Ah. The electrolytic solution is a solution of 1 mol/L $LiPF_6$ ethylene carbonate (EC) and dimethyl carbonate (DMC), in which the volume ratio between EC and DMC is 1:2.

Embodiments 2 to 5

The lithium-ion secondary batteries in Embodiments 2 to 5 are prepared in the same way as in Embodiment 1, except that the ratio of CW1/CW2 and the ratio of CW3/CW4 are controlled according to Table 1 below.

Embodiments 6 to 11

The lithium-ion secondary batteries in Embodiments 6 to 11 are prepared in the same way as in Embodiment 3, except that $LiFePO_4$ (hereinafter abbreviated as LFP) is used in place of NCM523 as the positive electrode plate material and the ratio of CapA/CapB is controlled according to Table 1 below.

Embodiments 12 to 16

The lithium-ion secondary batteries in Embodiments 12 to 16 are prepared in the same way as in Embodiment 3, except that LFP is used in place of NCM523 as the positive electrode plate material on the R1 side, NCM811 is used in place of NCM523 as the positive electrode plate material on the R2 side, and the ratio of (R1+R4)/(R2+R3) is controlled according to Table 1 below.

Embodiment 17

The lithium-ion secondary battery in Embodiment 17 is prepared in the same way as in Embodiment 16, except that NaFePO$_4$ (hereinafter abbreviated as NaVP) is used in place of LFP as the positive electrode plate material on the R1 side, and NaVP is used in place of NCM811 as the positive electrode plate material on the R2 side.

Comparative Embodiment 1

The lithium-ion secondary battery in Comparative Embodiment 1 is prepared in the same way as in Embodiment 1, except that the ratio of CW1/CW2 is controlled to be 0.2 and the ratio of CW3/CW4 is controlled to be 1.5 according to Table 1 below.

Comparative Embodiment 2

The lithium-ion secondary battery in Comparative Embodiment 2 is prepared in the same way as in Embodiment 6, except that the ratio of CapA/CapB is controlled to be 0.21 according to Table 1 below.

Comparative Embodiment 3

The lithium-ion secondary battery in Comparative Embodiment 3 is prepared in the same way as in Embodiment 12, except that the ratio of (R1+R4)/(R2+R3) is controlled to be 0.05 according to Table 1 below.

Testing the Resistance of the Active Material Layer

The resistance per unit area of the positive electrode plate may be determined by a test method well known in the art. As an example, the following method may be employed: The test instrument is an IEST BER1000 electrode plate resistance tester manufactured by Initial Energy Science & Technology Co. Ltd. The specific test steps include: cutting out a 10 cm×10 cm square specimen from the positive electrode plate (coated with a positive active material layer on both sides), clamping an upper side of the specimen to one conductive terminal of the internal resistance tester and clamping a lower side of the specimen to the other conductive terminal, applying a given pressure to fix the specimen, and measuring the resistance R of the specimen. The diameter of the conductive terminals is 14 mm, the applied pressure is 15 MPa to 27 MPa, and the range of the sampling time interval is 5 s to 17 s. Calculating the resistance per unit area of the positive electrode plate according to the formula r=R/S, where S is a contact area between the conductive terminals and the specimen (usually considered to be a cross-sectional area of the conductive terminals); and R is the specimen resistance value read out by the test instrument. In the secondary battery prepared in embodiments of this application, R1 is controlled to be 0.1Ω to 20Ω, R2 is controlled to be 0.15Ω to 22Ω, R3 is controlled to be 0.7 mΩ to 40 mΩ, and R4 is controlled to be 0.5 mΩ to 35 mΩ.

Testing the Capacity of the Electrode Plate

Cutting the positive electrode plate or negative electrode plate into small discs, and assembling the small discs into a button battery in a glovebox, where the electrode is made of a lithium metal, the separator is Celgard C2400, and the electrolytic solution is a solution of 1.3 mol/L LiPF$_6$ EC and DMC (the volume ratio between EC and DMC is 1:2). Measuring the capacity of the assembled button battery with a LAND tester.

Testing the Energy Density

Charging the secondary battery at a constant current rate of 0.1 C until the voltage reaches the rated voltage of 4.0 V, and keeping the voltage constant for 30 minutes. Subsequently, discharging the battery at a constant current rate of 0.1 C until the voltage reaches 2.5 V. Recording the energy released during the constant current discharge, and dividing the energy by the total mass of the secondary battery to obtain the energy density of the secondary battery.

Testing the Cycle Performance

Placing the prepared secondary battery on a Neware battery tester. Charging the battery at a constant current rate of 0.5 C at a temperature of 25° C. until the voltage reaches the rated voltage. Leaving the battery to stand for 5 minutes, and then discharging the battery at a constant current rate of 0.5 C until the voltage reaches the cut-off voltage, recording the discharge capacity, and then leaving the battery to stand for 5 minutes again. Repeating the foregoing cycle until the energy density drops to approximately 80% of the initial energy density, and recording the number of cycles at this time.

TABLE 1

Cycle performance of secondary batteries prepared in Embodiments 1 to 17 (E1-17) and Comparative Embodiments 1 to 3 (CE1-3)

| | Positive electrode plate | | Negative electrode plate | | CW1/ | CW3/ | CapA/ | (R1 + R4)/ | Energy density | Cycle life |
|---|---|---|---|---|---|---|---|---|---|---|
| | R1 side | R2 side | R3 side | R4 side | CW2 | CW4 | CapB | (R2 + R3) | (Wh/kg) | (cls) |
| E1 | NCM523 | NCM523 | Artificial graphite | Artificial graphite | 0.5 | 1.3 | 0.3 | 0.68 | 245 | 2300 |
| E2 | NCM523 | NCM523 | Artificial graphite | Artificial graphite | 0.62 | 1.25 | 0.3 | 0.68 | 250 | 2450 |
| E3 | NCM523 | NCM523 | Artificial graphite | Artificial graphite | 0.73 | 1.2 | 0.3 | 0.68 | 255 | 2400 |
| E4 | NCM523 | NCM523 | Artificial graphite | Artificial graphite | 0.85 | 1.1 | 0.3 | 0.68 | 264 | 2200 |
| E5 | NCM523 | NCM523 | Artificial graphite | Artificial graphite | 0.98 | 1 | 0.3 | 0.68 | 275 | 2000 |
| E6 | LFP | LFP | Natural graphite | Natural graphite | 0.73 | 1.2 | 0.312 | 0.68 | 142 | 4050 |
| E7 | LFP | LFP | Natural graphite | Natural graphite | 0.73 | 1.2 | 0.368 | 0.68 | 149 | 4230 |
| E8 | LFP | LFP | Natural graphite | Natural graphite | 0.73 | 1.2 | 0.522 | 0.68 | 164 | 4500 |
| E9 | LFP | LFP | Natural graphite | Natural graphite | 0.73 | 1.2 | 0.671 | 0.68 | 190 | 4680 |
| E10 | LFP | LFP | Natural graphite | Natural graphite | 0.73 | 1.2 | 0.772 | 0.68 | 197 | 4440 |
| E11 | LFP | LFP | Natural graphite | Natural graphite | 0.73 | 1.2 | 0.933 | 0.68 | 205 | 4256 |
| E12 | LFP | NCM811 | Artificial graphite | Artificial graphite | 0.73 | 1.2 | 0.3 | 0.12 | 212.8 | 2300 |
| E13 | LFP | NCM811 | Artificial graphite | Artificial graphite | 0.73 | 1.2 | 0.3 | 0.44 | 223 | 2500 |
| E14 | LFP | NCM811 | Artificial graphite | Artificial graphite | 0.73 | 1.2 | 0.3 | 0.62 | 240 | 2600 |
| E15 | LFP | NCM811 | Artificial graphite | Artificial graphite | 0.73 | 1.2 | 0.3 | 0.85 | 248 | 2450 |
| E16 | LFP | NCM811 | Artificial graphite | Artificial graphite | 0.73 | 1.2 | 0.3 | 1.00 | 259 | 2250 |
| E17 | NaVP | NaVP | Hard carbon | Hard carbon | 0.73 | 1.2 | 0.3 | 1.00 | 145 | 3460 |
| CE1 | NCM523 | NCM523 | Artificial graphite | Artificial graphite | 0.2 | 1.5 | 0.3 | 0.68 | 220 | 1800 |
| CE2 | LFP | LFP | Natural graphite | Natural graphite | 0.73 | 1.2 | 0.21 | 0.68 | 120 | 1900 |
| CE3 | LFP | NCM811 | Artificial graphite | Artificial graphite | 0.73 | 1.2 | 0.3 | 0.05 | 160 | 1650 |

As shown in Table 1, in Embodiments 1 to 5, with the increase of the ratio of CW1/CW2, the cycle life of the secondary battery tends to increase first and then decrease. As shown in Table 1, when the ratio is 0.62, the cycle life of the secondary battery is up to 2450 cycles. In contrast to the secondary battery prepared in Embodiment 5, the cycle life of the secondary battery increases by 22.5%. In addition, as the ratio of CW3/CW4 approaches the lower limit of 1.0 from the upper limit of 1.3, the gravimetric energy density of the secondary battery increases gradually.

As shown in Table 1, in Embodiments 6 to 11, with the increase of the ratio of CapA/CapB, the cycle life of the secondary battery tends to increase first and then decrease. As shown in Table 1, when the ratio of CapA/CapB is 0.671, the cycle life of the secondary battery is up to 4680 cycles. In contrast to the secondary battery prepared in Embodiment 6, the cycle life of the secondary battery increases by 15.6%. In addition, as the ratio of CapA/CapB approaches 0.933 from 0.312, the gravimetric energy density of the secondary battery increases gradually.

As shown in Table 1, in Embodiments 12 to 16, with the increase of the ratio of (R1+R4)/(R2+R3), the cycle life of the secondary battery tends to increase first and then decrease. As shown in Table 1, when the ratio of (R1+R4)/(R2+R3) is 0.62, the cycle life of the secondary battery is up to 2600 cycles. In contrast to the secondary battery prepared in Embodiment 16, the cycle life of the secondary battery increases by 15.6%. In addition, as the ratio of (R1+R4)/(R2+R3) approaches 1.00 from 0.12, the gravimetric energy density of the secondary battery increases gradually.

As can be seen from Embodiment 1 versus Comparative Embodiment 1, the cycle life and gravimetric energy density of the secondary battery are significantly affected by the ratio of CW1/CW2 controlled (to make R2 greater than R1) and the ratio of CW3/CW4 controlled (to make R3 greater than or equal to R4). As can be seen from Embodiment 6 versus Comparative Embodiment 2, the cycle life and gravimetric energy density of the secondary battery are significantly affected by the ratio of CapA/CapB controlled. As can be seen from Embodiment 12 versus Comparative Embodiment 3, the cycle life and gravimetric energy density of the secondary battery are also significantly affected by the ratio of (R1+R4)/(R2+R3) controlled.

It is hereby noted that this application is not limited to the foregoing embodiments. The foregoing embodiments are merely examples. Any and all embodiments with substantively the same composition or exerting the same effects as the technical ideas hereof without departing from the scope of the technical solutions of this application still fall within the technical scope of this application. In addition, all kinds of variations of the embodiments conceivable by a person skilled in the art and any other embodiments derived by combining some constituents of the embodiments hereof without departing from the subject-matter of this application still fall within the scope of this application.

What is claimed is:

1. A secondary battery, wherein the secondary battery comprises a positive electrode plate, a negative electrode plate, and a separator between the positive electrode plate and the negative electrode plate:

wherein the positive electrode plate comprises a positive current collector, a first positive active material layer distributed on one side of the positive current collector and a second positive active material layer distributed on another side of the positive current collector;

wherein the negative electrode plate comprises a negative current collector, a first negative active material layer distributed on one side of the negative current collector and opposite to the second positive active material layer and a second negative active material layer distributed on another side of the negative current collector;

a coating weight of a positive active material per unit area of the first positive active material layer is CW1 and a coating weight of the positive active material per unit area of the second positive active material layer is CW2;

wherein 6.5 mg/cm² ≤ CW1 ≤ 32.5 mg/cm², 6.5 mg/cm² ≤ CW2 ≤ 32.5 mg/cm² and 0.5 ≤ CW1/CW2 < 1;

wherein the first negative active material layer and the second negative active material layer are different in composition and wherein, a resistance of the first positive active material layer is R1, a resistance of the second positive active material layer is R2, a resistance of the first negative active material layer is R3, a resistance of the second negative active material layer is R4, and the resistances R1, R2, R3, and R4 are Ohmic resistances and satisfy the following relationships:

$$R2 > R1; \tag{1}$$

$$R3 \geq R4; \tag{2}$$

$$0 < (R1+R4)/(R2+R3) \leq 1; \text{ and} \tag{3}$$

$$R1/R2 = A \times R4/R3, \text{ wherein } A \text{ is } 0.8 \text{ to } 1.2, \tag{4}$$

wherein R1 is 0.1Ω to 20Ω, R2 is 0.15Ω to 22Ω, R3 is 0.7 mΩ to 40 mΩ, and
   R4 is 0.5 mΩ to 35 mΩ.

2. The secondary battery according to claim 1, wherein A is 0.95 to 1.05.

3. The secondary battery according to claim 1, wherein R1 is 0.5Ω to 10Ω, R2 is 0.55Ω to 12Ω, R3 is 1 mΩ to 30 mΩ, and R4 is 1.1 mΩ to 30 mΩ.

4. The secondary battery according to claim 1, wherein a coating weight of a negative active material per unit area of the first negative active material layer is CW3, a coating weight of the negative active material per unit area of the second negative active material layer is CW4, wherein 5.2 mg/cm² < CW3 ≤ 19.5 mg/cm², 5.2 mg/cm² ≤ CW4 ≤ 19.5 mg/cm² and the coating weight satisfies 1 ≤ CW3/CW4 < 1.5.

5. The secondary battery according to claim 1, wherein a compacted density of the first positive active material layer and/or the second positive active material layer is 2.0 g/cm³ to 3.6 g/cm³, and a compacted density of the first negative active material layer and/or the second negative active material layer is 0.5 g/cm³ to 2 g/cm³.

6. The secondary battery according to claim 5, wherein a compacted density of the first positive active material layer and/or the second positive active material layer is 2.3 g/cm³ to 3.5 g/cm³, and a compacted density of the first negative active material layer and/or the second negative active material layer is 1.0 g/cm³ to 1.8 g/cm³.

7. The secondary battery according to claim 1, wherein the first positive active material layer and/or the second positive active material layer each independently contain at least one of an NCM ternary material, an NCA ternary material, lithium iron phosphate, lithium manganese oxide, lithium cobalt oxide, active-sodium-ion-containing oxide, a polyanion material, or a Prussian blue-based material.

8. The secondary battery according to claim 1, wherein the first positive active material layer and/or the second positive active material layer each independently contain a conductive agent and a binder, the conductive agent is graphite, carbon black, acetylene black, graphene, carbon nanotubes, or a combination thereof, and the binder is selected from polyvinylidene difluoride, polyacrylic acid, polytetrafluoroethylene, polyimide, or a combination thereof.

9. The secondary battery according to claim 1, wherein the first negative active material layer and/or the second negative active material layer each independently contain natural graphite, artificial graphite, graphene, carbon nanotubes, soft carbon, hard carbon, or a combination of two or more thereof.

10. A battery module, comprising the secondary battery according to claim 1.

11. A battery pack, comprising the secondary battery according to claim 1.

12. An electrical device, comprising the secondary battery according to claim 1.

\* \* \* \* \*